(12) United States Patent
Matsufusa

(10) Patent No.: US 6,766,476 B2
(45) Date of Patent: Jul. 20, 2004

(54) COMPUTER RECOVERY APPARATUS

(75) Inventor: Ichiroh Matsufusa, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 09/904,345

(22) Filed: Jul. 12, 2001

(65) Prior Publication Data

US 2002/0035707 A1 Mar. 21, 2002

(30) Foreign Application Priority Data

Jul. 13, 2000 (JP) .................................. 2000-212991

(51) Int. Cl.⁷ .............................................. G06F 11/00
(52) U.S. Cl. .............................. 714/38; 714/15; 713/1; 713/2
(58) Field of Search .............................. 714/38, 15, 23, 714/36, 6; 713/1, 2; 717/174, 175

(56) References Cited

U.S. PATENT DOCUMENTS

| | | | | |
|---|---|---|---|---|
| 5,469,573 A | * | 11/1995 | McGill et al. .............. | 717/127 |
| 5,481,714 A | * | 1/1996 | Pipkin et al. ............... | 717/175 |
| 6,195,695 B1 | * | 2/2001 | Cheston et al. ............ | 709/221 |
| 6,253,320 B1 | * | 6/2001 | Sekiguchi et al. ........... | 713/2 |
| 6,317,845 B1 | * | 11/2001 | Meyer et al. ................ | 714/23 |
| 6,393,585 B1 | * | 5/2002 | Houha et al. ................ | 714/23 |
| 6,418,555 B2 | * | 7/2002 | Mohammed ................ | 717/169 |
| 6,519,762 B1 | * | 2/2003 | Colligan et al. ............ | 717/170 |
| 6,591,376 B1 | * | 7/2003 | VanRooven et al. ......... | 714/36 |

OTHER PUBLICATIONS

Microsoft Windows 2000 Professional Unleashed. Chapter 4. Troubleshooting the Setup. http://proquest.safaribookson-lin.com/0672317427/ch04lev1sec4.*

INFO: Windows NT 4.0 Setup Troubleshooting Guide. http://support.microsoft.com/default.aspx?scid=kb;e-n-us;126690.*

* cited by examiner

Primary Examiner—Robert Beausoliel
Assistant Examiner—Yolanda L Wilson
(74) Attorney, Agent, or Firm—Martin J. McKinley

(57) ABSTRACT

While restoring a preload image to a hard drive, the ability to boot the operating system on the hard drive is inhibited until the recovery process is complete. In one embodiment, a file that must be loaded in order to boot the operating system on the hard drive (for example, IO.SYS) is written to the hard disk only at the end of the recovery operation. If a user inadvertently attempts to start the operating system before the recovery operating is complete, the operating system will not boot until the recovery process is complete and the required file is written to the appropriate directory (usually the root directory) on the hard drive.

28 Claims, 6 Drawing Sheets

COMPUTER RECOVERY APPARATUS

BACKGROUND OF THE INVENTION

This invention pertains to computer systems and other information handling systems and, more particularly, to a computer recovery apparatus and method, a recording medium on which a computer recovery program is recorded, and a delivery apparatus for delivering the recovery program that takes a measure against an operation for activating an operating system mistakenly performed in the process of recovering a preload image on a computer.

In a personal computer, a user can restore the hard disk to its original state on delivery. That is, in the event the operating system does not function because the hard disk is damaged or files have been erased, the user can restore the preload image on the hard disk by using a recovery CD-ROM packaged with the personal computer.

The preload image is recorded on the CD-ROM, typically in compressed form to reduce the total memory capacity of the CD-ROM needed to store the image. Various file compression formats are available. Well-known compression schemes include, for example, Drive Image (compression/decompression software name) compression format from Power Quest (a file compressed in this format is called a drive image) and PKZip (compression/decompression software name) compression format from PKWare (a file compressed in this format is called a Zip file). Typically, the whole or main part of an operating system (OS) in the preload image is recorded as a drive image, and other files are recorded as Zip files on the recovery CD-ROM. During the recovery of the preload image onto a hard disk, a "recovery OS" (for example, DOS) is activated instead of the "normal OS" that is recorded on the hard disk and activated in normal times (for example, Windows or Linux). The recovery OS is a minimum collection of files required to perform functions required for the recovery task. The total file size of the recovery OS is far smaller than that of the normal OS. The recovery OS is recorded on a floppy disk created in advance by the user, or on the recovery CD-ROM itself. During the recovery process, part of the normal OS recorded on the recovery CD-ROM as a drive image is first recovered onto the hard disk, then the personal computer (PC) is rebooted by the recovery OS to cause the CPU of the PC to recognize predetermined hardware, and then the remaining files recorded in Zip format on the recovery CD-ROM are recovered onto the hard disk.

In a conventional PC, when a user is prompted to reactivate a recovery OS after the completion of the recovery onto the hard disk of the preload image portion in Drive Image format, or when the user is prompted to replace the current recovery CD-ROM because the preload image is recorded on more than one recovery CD-ROM, the user may often mistakenly assume that the recovery has been completed, remove the recovery CD-ROM from the CD-ROM driver, and perform an operation to activate the normal OS on the hard disk. In such a case, since all the recovery has not been completed, the user finds that desired programs have not been installed and may call a support center of the manufacturer of the PC. It may take considerable time for the support center personnel to understand the specific conditions described by the user, preventing it from quickly providing a proper response to the user.

In an apparatus described in Published Unexamined Patent Application No. 10-307725, when a user operates a predetermined key in activating an OS, the CPU of the PC assumes the operation to be an operation for reading the OS from a CD-ROM drive. When the CPU finds that the CD-ROM drive contains no activation CD-ROM, it opens the tray of the CD-ROM drive or displays a message notifying the user that no activation CD-ROM is contained in the drive. However, for the user to operate the predetermined key in activating the OS in this apparatus, the user should know the operation is for activating a recovery OS rather than a normal OS. If the user does not know that the recovery is uncompleted and mistakenly assumes it to be the activation of the normal OS, the apparatus cannot take a measure against the operation for activating the normal OS mistakenly attempted by the user.

Accordingly, it is an object of the present invention to provide a computer recovery apparatus and method, a recording medium on which a recovery program is recorded, and a delivery apparatus for delivering the recovery program that can prevent a user from inadvertently activating a normal OS during recovery.

SUMMARY OF THE INVENTION

According to a first computer recovery apparatus and method of the present invention, preload image data recorded on a recovery recording medium is read to recover the preload image onto an external storage device. In this computer recovery apparatus, the OS to be recovered onto the external storage device is defined as a "normal OS" and the OS which is used for the recovery task is defined as a "recovery OS." If a user mistakenly tries to activate the normal OS before the recovery process is complete, the normal OS will fail.

The computer may be, for example, a personal computer (PC). Typically, the external storage device is a hard disk, including a magnetic storage device and a nonvolatile memory unit. It is required that the external storage device have a storage capacity sufficient to store the normal OS. The file size of the recovery OS is far smaller than that of the normal OS; the recovery OS has a minimum file size required for accomplishing recovery. The recovery OS may be recorded on the recovery medium together with the preload image, or it may be recorded on a medium other than the recovery medium, such as a floppy disk. The term "image" refers to a copy of certain portions of a storage device. A "preload image" contains at least the image of the entire normal OS, and typically contains given application software along with the normal OS.

For example, the user may mistakenly activate the normal OS during recovery in the following cases: (a) part of the preload image is compressed in Drive Image format, and the compressed image must be recovered into an external storage device and the recovered part must be first recognized by the OS before the recovery process can proceed to the next phase, therefore the user is prompted to reactivate a recovery OS, but the user misdeems that the recovery is completed, or (b) a plurality of recording media for recovery are provided because the amount of the preload image is large and, after the completion of the recovery from the current recovery medium, the user is prompted to replace the current recovery medium with the next recovery medium, but the user does not recognize it and misdeems that the recovery is completed.

Thus, if the user mistakenly activates the normal OS when the recovery process has not been completed, the normal OS will fail. Thus, the user is aware that there has been an error and to restart or complete the recovery operation.

According to a second computer recovery apparatus and method of the present invention, a file which is recorded on a predetermined location in the external storage device and to be read for activating a normal OS is defined as a presence-requisite-for-OS-activation file in the first computer recovery apparatus and method. This presence-requisite-for-OS-activation file is kept absent from the predetermined location until the completion of a recovery, the completion of the last reactivation of a recovery OS in a recovery task, or the completion of the last replacement of a recovery recording medium in the recovery task.

The presence-requisite-for-OS-activation file may be a file called the "system file", such as IO.SYS and COMMAND.COM if the normal OS is Windows 95 or 98, for example.

Once the recovery is completed, the entire preload image is present in the external storage device, therefore no trouble to the user can occur even if the normal OS is activated. The user can mistakenly perform an operation for activating the normal OS when he/she attempts to reactivate the recovery OS, or replace a recovery recording medium during a recovery task. Once the reactivation of the last recovery OS is completed or the last replacement of the recovery recording medium is completed during the recovery task, there is little possibility that the user will mistakenly perform an operation for activating the normal OS, therefore the presence-requisite-for-OS-activation file for activating the normal OS may be placed in a predetermined directory.

If the presence-requisite-for-OS-activation file does not exist, or if it does exist but in a location other than the predetermined location, the computer cannot read the normal OS and an attempt to activate the normal OS will fail.

According to a third computer recovery apparatus and method of the present invention, in the first computer recovery apparatus and method, a file recorded on a predetermined location in the external storage device and to be read for activating a normal OS is defined as a presence-requisite-for-OS-activation file and an activation-failure-causing presence-requisite-for-OS-activation file which has the same name as that of the presence-requisite-for-OS-activation file and does not activate the normal OS even if it is read is provided besides the regular presence-requisite-for-OS-activation file. This activation-failure-causing presence-requisite-for-OS-activation file is kept present in the predetermined location instead of the regular presence-requisite-for OS-activation file until the completion of a recovery, the completion of the last reactivation of the recovery OS in the recovery task, or the completion of the last replacement of the recovery recording medium in the recovery task.

If the user mistakenly performs an operation for activating the normal OS, the activation-failure-causing presence-requisite-for-OS-activation will be read by the computer. Because the file is the activation-failure-causing presence-requisite-for-OS-activation, the activation of the normal OS will fail.

According to a fourth computer recovery apparatus and method of the present invention, in the first computer recovery apparatus and method of the present invention, a file which is recorded on a predetermined location in the external storage device and to be read for activating a normal OS is defined as a presence-requisite-for-OS-activation file and a modified presence-requisite-for-OS-activation file modified from the regular presence-requisite-for-OS-activation so as to cause the activation of the normal OS to fail is provided besides the regular presence-requisite-for-OS-activation file. This modified presence-requisite-for-OS-activation file is kept present in the predetermined location instead of the regular presence-requisite-for OS-activation file until the completion of the recovery, the completion of the last reactivation of the recovery OS in the recovery task, or the completion of the last replacement of the recovery recording medium in the recovery task.

If the user mistakenly performs an operation for activating the normal OS, the modified presence-requisite-for-OS-activation file activation-failure-causing will be read by the computer. Because the modified presence-requisite-for-OS-activation file contains modified part (for example, a pause command) to cause the activation of the normal OS to fail, the activation of the normal OS will fail. Modifications of IO.SYS and COMMAND.COM in Windows 95 and 98 by a third party are prohibited. Therefore, only those files allowed to be modified by a third party can be the modified presence-requisite-for-OS-activation file.

According to a fifth computer recovery apparatus and method of the present invention, in the first computer recovery apparatus and method, a file which does not need to be read for the activation of a normal OS but is read and executed during the activation of the normal OS if the file exists in a predetermined location in the external storage device is defined as a read-at-OS-activation file and an activation-failure-causing read-at-OS-activation file which has the same name as that of the read-at-OS-activation file and does not activate the normal OS when it is read is provided besides the regular presence-requisite-for-OS-activation file. This activation-failure-causing read-at-OS-activation file is kept present in the predetermined location instead of the regular read-at-OS-activation file until the completion of the recovery, the completion of the last reactivation of the recovery OS in a recovery task, or the completion of the last replacement of the recovery recording medium in the recovery task. The read-at-OS-activation file may be, for example, AUTOEXEC.BAT if the normal OS is Windows 95 or 98.

If the user mistakenly performs an operation for activating the normal OS, the activation-failure-causing read-at-OS-activation file will be read by the computer. Because the read-at-OS-activation file is the activation-failure-causing file, the activation of the normal OS will fail.

According to a sixth computer recovery apparatus and method of the present invention, in the first computer recovery apparatus and method of the present invention, a file which does not need to be read for the activation of a normal OS but is read and executed during the activation of the normal OS if the file exists in a predetermined location in the external storage device is defined as a read-at-OS-activation file, and besides this regular read-at-OS-activation file, a modified read-at-OS-activation file which is modified so as to cause the activation of the normal OS to fail if read by the computer is provided. This modified read-at-OS-activation file is kept present in the predetermined location instead of the regular read-at-OS-activation file until the completion of the recovery, the completion of the last reactivation of the recovery OS in the recovery task, or the completion of the last replacement of the recovery recording medium in the recovery task.

If the user mistakenly performs an operation for activating the normal OS, the modified read-at-OS-activation file will be read by the computer. However, because the modified read-at-OS-activation file contains modified part (for example, a pause command) to cause the activation of the normal OS to fail, the activation of the normal OS will fail.

According to a seventh computer recovery apparatus and method of the present invention, in the first computer recovery apparatus and method of the present invention, a file which does not need to be read for the activation of a normal OS but is read and executed during the activation of the normal OS if the file exists in a predetermined location in the external storage device is defined as a read-at-OS-activation file, and an activation-failure-causing read-at-OS-activation file for causing the activation of the normal OS to fail when read by the computer is provided. This activation-failure-causing read-at-OS-activation file is kept present in the predetermined location until the completion of the recovery, the completion of the last reactivation of the recovery OS in a recovery task, or the completion of the last replacement of the recovery recording medium in the recovery task. After the completion of the recovery, the completion of the last reactivation of the recovery OS in the recovery task, or the completion of the last replacement of the recovery recording medium in the recovery task, all the read-at-OS-activation files, including the activation-failure-causing read-at-OS-activation file, are deleted from the predetermined location.

If the user mistakenly performs an operation for activating the normal OS, the activation-failure-causing read-at-OS-activation file will be read by the computer. This causes the activation of the normal OS to fail. Because the read-at-OS-activation files no longer exists once the recovery is completed, the last reactivation of a recovery OS in a recovery task is completed, or the last replacement of a recording medium for recovery in the recovery task is completed, the computer cannot read the activation-failure-causing read-at-OS-activation file during the activation of the normal OS and the normal OS is activated successfully.

According to an eighth computer recovery apparatus and method of the present invention, in any of the first to seventh computer recovery apparatuses and methods of the present invention, if a user mistakenly performs an operation for activating the normal OS before the completion of the recovery, the completion of the last reactivation of the recovery OS in the recovery task, or the completion of the last replacement of the recovery recording medium in the recovery task, the user is notified of the activation operation mistake. The user can know that he/she has mistakenly performed the operation for activating the normal OS by this notification.

According to a ninth computer recovery apparatus and method of the present invention, in the eighth computer recovery apparatus and method of the present invention, the notification of the operation for activating the normal OS mistakenly performed by the user is provided by displaying text on a display or generating a sound for notifying the user of the mis-activation-operation, or ejecting a tray containing the recovery recording medium.

According to a tenth computer recovery apparatus and method of the present invention, in any of the first to ninth computer recovery apparatuses and methods of the present invention, if the user mistakenly performs an operation for activating the normal OS before the completion of the recovery, the completion of the last reactivation of the recovery OS in the recovery task, or the completion of the last replacement of the recovery recording medium in the recovery task, an error code corresponding to the mis-activation-operation is provided to the user.

The user can report the error code to a support center and the support center personnel can quickly identify the cause of the error and advice the user of an appropriate remedial action.

A recording medium and delivery apparatus of the present invention is arranged to record and deliver a recovery program describing the steps performed by the first to tenth computer recovery methods described above.

DESCRIPTION OF THE ILLUSTRATIVE EMBODIMENTS

Embodiments of the present invention will be described below with reference to the accompanying drawings.

Figure 1:
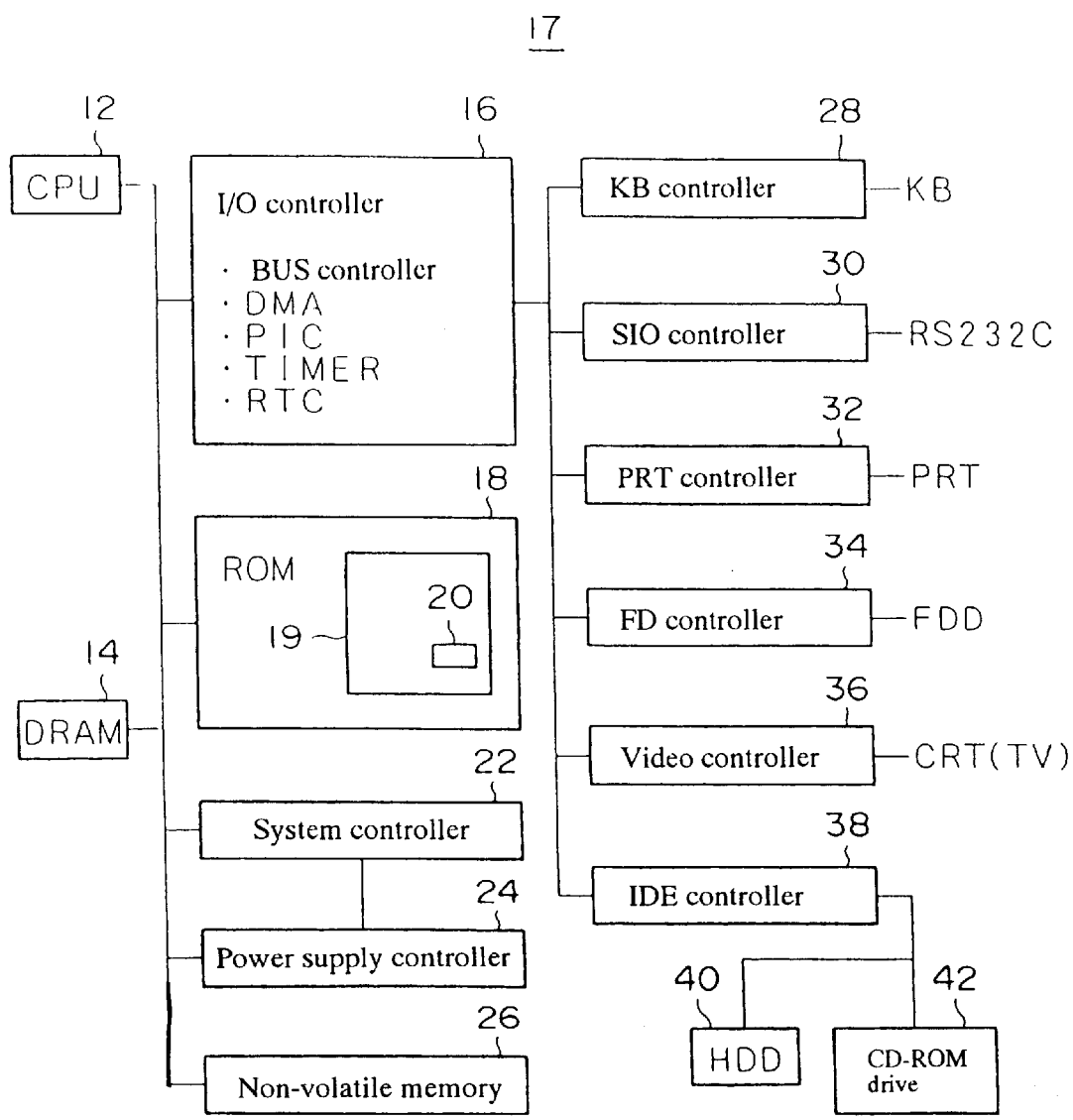
FIG. 1 shows a block diagram of a hardware configuration of a personal computer.

FIG. 1 shows a block diagram of a hardware configuration of a personal computer (PC) 10. Reference number 12 indicates a central processing unit (CPU) responsible for controlling the entire system and executing a boot processing routine of a control program stored in basic input/output system read only memory (BIOS-ROM) 18 during the activation of an operating system (OS). In the boot processing routine, default priorities are assigned to drives for finding a system disk (a disk on which the OS is written). The priorities are assigned to, from highest to lowest, a floppy disk drive, a CD-ROM drive 42, and a hard disk drive 40. Reference number 14 indicates main memory (DRAM). The main memory 14 is used as a storage area for storing programs executed by the CPU 12, and a working area. Reference number 16 indicates an I/O controller for controlling DMA, PIC, RTC, and the like. The CD-ROM drive 42 may also be used as a drive for other CDs such as CD-Audio, and for DVDs such as DVD-ROM, DVD-Audio, and DVD-Video, besides the CD-ROM. Reference number 18 indicates the BIOS-ROM containing a system control program and stores a boot processing program 19 including a guide message 20. Reference number 22 indicates a system controller for controlling hardware specific to the system. Reference number 24 indicates a power supply controller for controlling various types of power supply control in the system. Reference number 26 indicates non-volatile memory for storing settings of system setup programs. Reference numbers 28, 30, 32, 34, 36, and 38 indicate I/O controllers.

Reference number 28 indicates a controller for a keyboard (KB), 30 indicates a controller for an SIO, 32 indicates a controller for a parallel I/O, 34 indicates a controller for the floppy disk drive, 36 indicates a controller for a display device (CRT), 38 indicates an IDE controller to which the hard disk drive 40 and the CD-ROM drive used for a CD and DVD.

Figure 2:
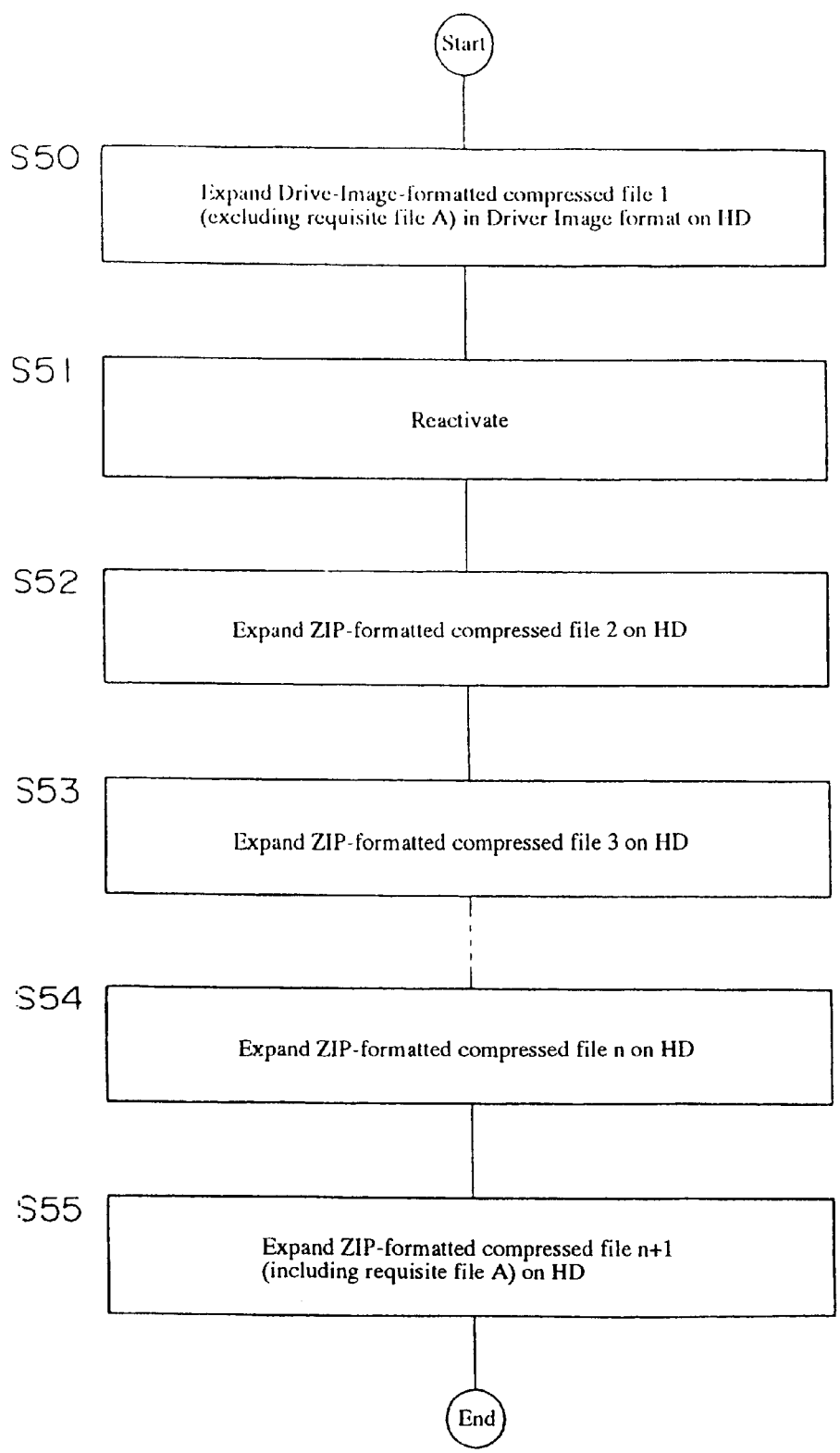
FIG. 2 shows a flowchart of a first recovery process for recovering a preload image onto a hard disk.

FIG. 2 shows a flowchart of a first recovery process for recovering a preload image onto a hard disk. In this example of the recovery process, it is assumed that the preload image is contained in a single recovery CD-ROM. Before describing this flowchart, a normal OS and a recovery OS will be defined as follows.

Normal OS: an OS that is recorded on a hard disk and to be recovered. The normal OS is activated as an OS on normal activation operations and able to provide all capabilities of the PC 10. Examples of the normal OS include Windows 95 and 98 and other OSs.

Recovery OS; an OS that is recorded on Floppy disks or a CD-ROM, that is, a recording medium other than the hard disk, and activated for performing a recovery task. In order to reduce the file size, only a minimum collection of capabilities required is contained in the recovery OS. Examples of the recovery OS include DOS and the like.

At step S50, a compressed file 1 is expanded on the hard disk. The compressed file 1 is compressed in Drive Image format, contains part of the normal OS and lacks at least one file, "A", which may be IO.SYS or COMMAND COM, for example, which will be described below, out of one or more files requisite for activating the normal OS. At step S51, the recovery OS is activated. Typically, because the recovery OS is recorded on a recovery CD-ROM, the user proceeds to the reactivation operation of the OS with the recovery CD-ROM remaining in the CD-ROM drive 42. However, if the recovery OS is not recorded on a recovery CD-ROM, the user must insert a Floppy disk containing the recovery OS into the Floppy disk drive before proceeding to the reactivation operation of the OS. The reactivation operation is the same as the normal activation of the OS. There are no differences in the activation operation between the normal OS and the recovery OS. Because the PC halts after the process at step S50, the user is apt to mistakenly assume that the halt indicates the completion of the recovery and remove the recovery CD-ROM from the CD-ROM drive 42 to perform an activation operation. In such a case, the activation of the normal OS recovered on the hard disk is attempted. However, because requisite file A is absent from the hard disk, the activation of the normal OS will fail, as will be described below. Therefore, the recovery OS is reactivated by the reactivation operation at step 51. Compressed files 2, 3, . . . , n are expanded at steps S52, S53, . . . , S54, respectively. These compressed files 2, 3, . . . , n and compressed file n+1 at step 55 are compressed in ZIP format. At step S55, compressed file n+1 is expanded on the hard disk. Compressed file n+1 contains at least requisite file A, which is not contained in compressed file 1, and may contain only requisite file A or may contain a number of files in addition to requisite file A.

Figure 3:
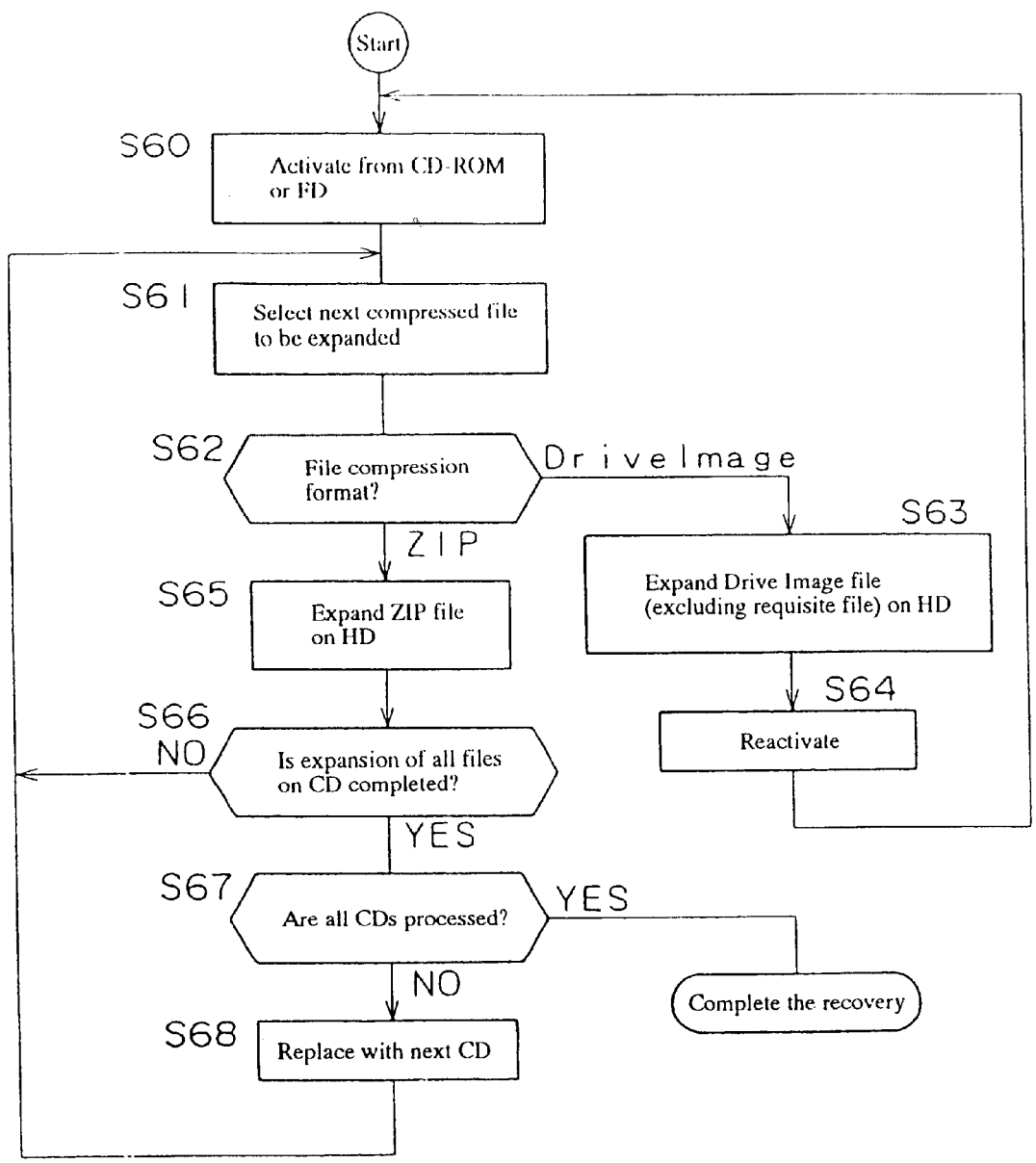
FIG. 3 shows a flowchart of a second recovery process for recovering a preload image onto a hard disk.

FIG. 3 is a flowchart of a second recovery process for recovering a preload image on a hard disk. In this example of the recovery process, it is assumed that the preload image is split across a plurality of recovery CD-ROMs. On the first recovery CD-ROM, a recovery OS is recorded together with compressed file compressed in Drive Image format containing at least part of a normal OS. At step 60, the recovery OS is activated from the recovery CD-ROM itself or Floppy disks. At step 61, the next compressed file to be expanded is selected. At step 62, the compression format of the compressed file selected at step S61 is determined. If the format is Drive Image, the process proceeds to step S63. If the format is ZIP, the process proceeds to step S65. During the recovery of preload image onto the hard disk, a Drive-Image-format compressed file is first expanded on the hard disk, then ZIP-format compressed file are expanded on the hard disk. Therefore, at the first branch point, step S62, the process always branches to step S63. At step S63, the Drive-Image-format compressed file is expanded on the hard disk. The Drive-Image-format compressed image contains at least part of a normal OS but lacks file A, which needs to be read for activating the normal OS, as in step S50 described above. At step 64, the recovery OS is reactivated. Because the recovery CD-ROM containing the Drive-Image-format compressed file contains the recovery OS, the user performs the reactivation operation with the recovery CD-ROM held in the CD-ROM drive 42. If the recovery CD-ROM does not contain the recovery OS, the user must insert a Floppy disk containing the recovery OS into an Floppy disk drive. Because the PC enters halt state after the completion of step S63, the user can mistakenly assume that this halt state indicates the completion of the recovery and can remove the recovery CD-ROM from the CD-ROM drive 42. If the user performs a reactivation operation with the first recovery CD-ROM being removed from the CD-ROM drive 42, the activation of the normal OS will fail because requisite file A is absent from the hard disk, as will be described below. Therefore, the recovery OS is reactivated by the reactivation operation at step S64. After step S64, the process returns to step S60. The ZIP-format compressed file is expanded on the hard disk at step S65. If the CD-ROM held in the CD-ROM drive 42 is the last recovery CD-ROM to be inserted into the CD-ROM drive 42 in the recovery task, the compressed file expanded on the hard disk at step S65 includes requisite file A. At step S66, it is determined whether all the compressed files on the recovery CD-ROM currently held in the CD-ROM drive 42 have been expanded on the hard disk or not. If YES, the process proceeds to step S67. If NO, the process returns to step S61. At step S67, it is determined whether the recoveries from all the recovery CD-ROMs have been completed or not. If NO, the process proceeds to step S68. If YES, the recovery process terminates. At step S68, the recovery CD-ROM in the CD-ROM drive 42 is replaced with the next recovery CD-ROM, then the process returns to step S61.

Figure 4:
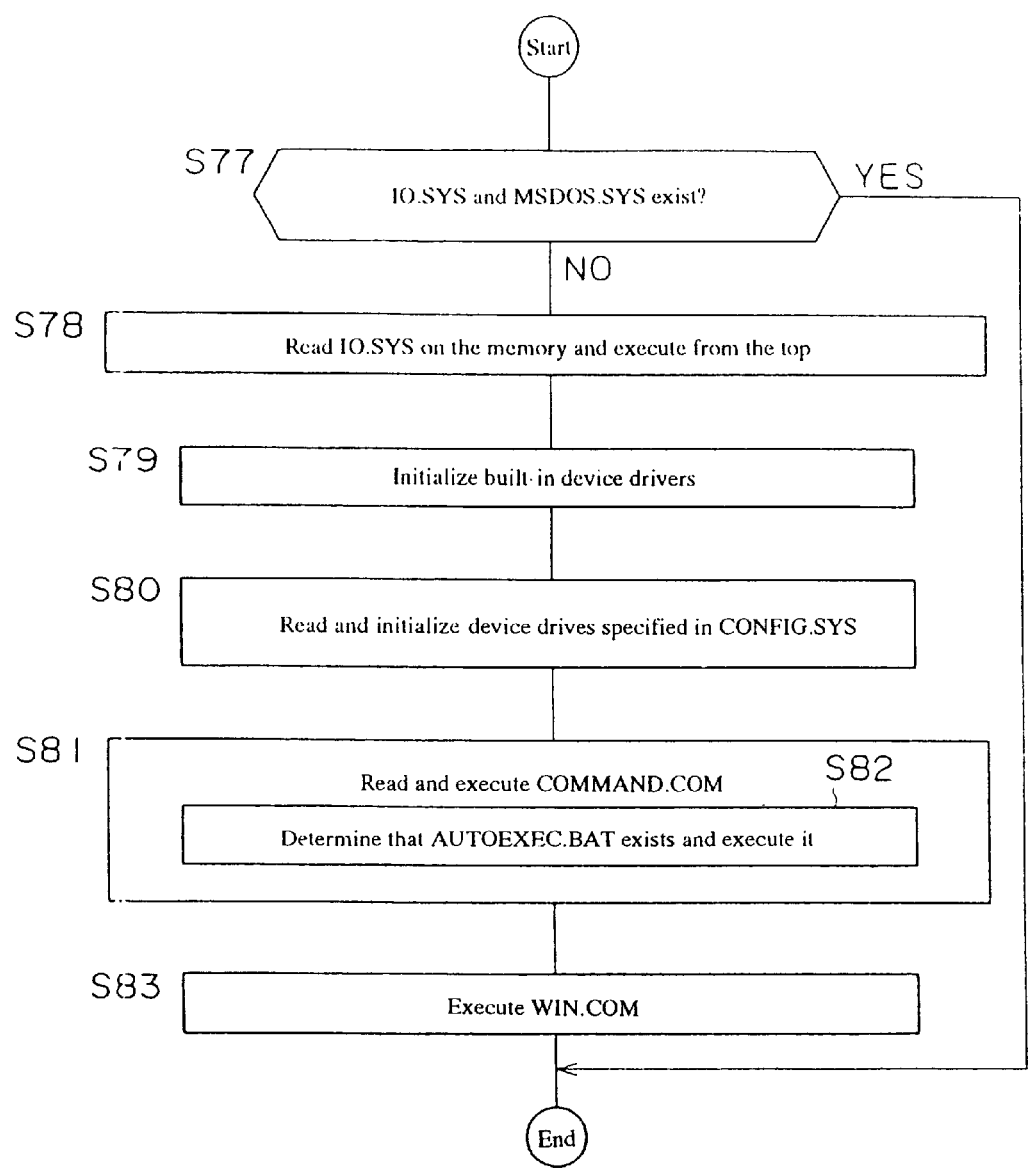
FIG. 4 shows a flowchart of an activation process of Windows as an OS.

FIG. 4 shows a flowchart of an activation process of Windows as an OS. Windows is recorded on a hard disk and also stored in a recovery CD-ROM as the OS to be recovered. At step 77, it is determined whether the root directory on the hard disk contains IO.SYS and MSDOS.SYS files. If YES, the process proceeds to step S78 and the following steps. If NO, the program immediately terminates, that is, the activation of Windows as an normal OS fails. IO.SYS, MSDOS.SYS, and COMMAND.COM are called "system files" and if one of them are not contained in the root directory, the activation from the recovery recording medium fails. At least one file, "A", which is requisite for the activation of the normal OS, is chosen from these system files. In this example, IO.SYS is chosen as file A. IO.SYS is read into DRAM 14 at step S78. At step S79, built-in device drivers are initialized. At step 80, device drives specified in CONFIG.SYS are read and initialized. At step S81, COMMAND.COM is read and executed. If AUTOEXEC.BAT is contained in the root directory, it is executed at step S82, which is a sub-process at step S81. If AUTOEXEC.BAT is not contained in the root directory, step S82 is bypassed. At step S83, WIN.COM is executed, resulting in the activation of Windows as the OS.

Figure 5:
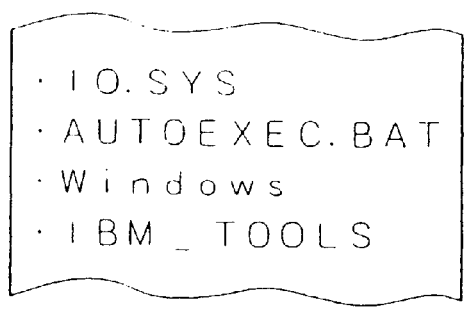
FIG. 5 shows files existing on a hard disk on the completion of a recovery.

FIG. 5 shows files existing on a hard disk on the completion of a recovery. IBM.TOOLS is illustrated as software attached to an OS on a recovery recording medium by the manufacturer of a PC 10 on delivery of the PC 10 and included in the preload image. IO.SYS is requisite file A, which should be contained in the root directory on the hard disk in order for Windows to be activated as an OS.

Figure 6:
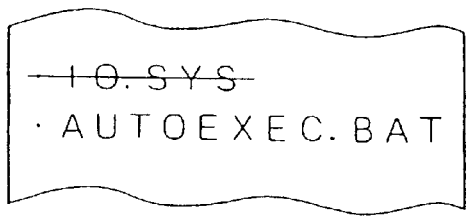
FIG. 6 shows main files existing on the hard disk during the recovery.

FIG. 6 shows main files existing on the hard disk during the recovery. The transverse line indicates that the file marked out by the line does not exist. IO.SYS is a requisite file which should be contained in the root directory of drive C, that is, the hard disk, for activating Windows. Because IO.SYS does not exist in the root directory in FIG. 6, an activation would fail, that is, Windows would not activated, if the user removes the recovery CD-ROM from the CD-ROM drive 42 and performs the activation operation. On the other hand, after the completion of the recovery, the state of the hard disk returns to the state shown in FIG. 5, which contains regular IO.SYS in the root directory.

Figure 7:
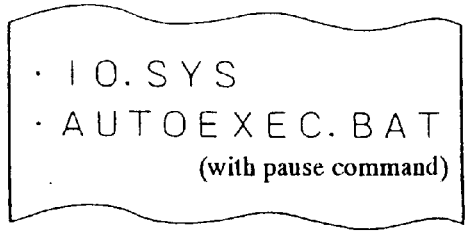
FIG. 7 shows main files existing on the hard disk during the recovery.
Figure 8:
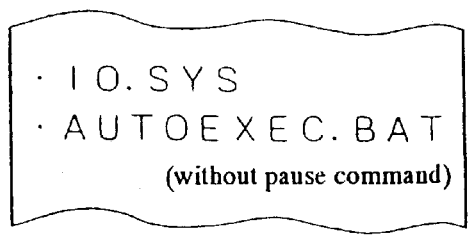
FIG. 8 shows main files existing on the hard disk after the completion of the recovery.

FIGS. 7 and 8 show main files existing on the hard disk during the recovery and after the completion of the recovery, respectively. AUTOEXEC.BAT contains a halt command, PAUSE, for example, for causing the activation of Windows to fail. Windows would be activated successfully even if AUTOEXEC.BAT does not exist in the root directory of drive C. If AUTOEXEC.BAT exist in the root directory of the drive C, it is read and the contents of which is executed during the activation of Windows. The presence of AUTOEXEC.BAT with the PAUSE command brings the PC into a halt state and the activation of Windows fails even if the user mistakenly performs an operation for activating Windows in the middle of the recovery. After the completion of the recovery, the PAUSE command in AUTOEXEC.BAT is removed as shown in FIG. 8, and the CPU 12 reads Windows after reading AUTOEXEC.BAT, to activate Windows.

Figure 9:
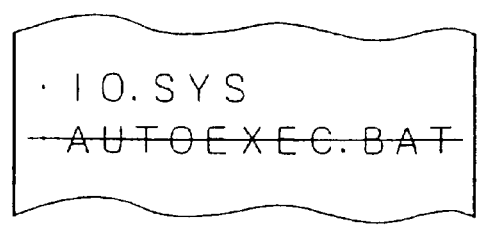
FIG. 9 shows an exemplary variation of the file appearance shown in FIG. 8.

FIG. 9 shows a variation of file appearance shown in FIG. 8. Instead of replacing AUTOEXEC.BAT containing PAUSE command with regular AUTOEXEC.BAT without PAUSE command after the completion of the recovery as shown in FIG. 8, AUTOEXEC.BAT is deleted entirely from the root directory of drive C in FIG. 9. Because the CPU 12 reads and activates Windows even if AUTOEXEC.BAT does not exist, Windows is activated successfully by deleting AUTOEXEC.BAT from the root directory of drive C.

What is claimed:

1. A computer recovery apparatus for reading preload image data from a recovery recording medium to recover a preload image onto a storage device, wherein:
   an OS which is recorded on said external storage device and to be recovered is defined as a normal OS and an OS which is recorded on a recording medium other than said—remove external—storage device and used for a recovery task is defined as a recovery OS;
   said apparatus comprises a failure forcing unit for causing the activation of the normal OS to fail if a user mistakenly performs an operation for activating the normal OS during the recovery.

2. The computer recovery apparatus according to claim 1, wherein:
   a file which is recorded on a predetermined location in said—remove external—storage device and to be read for activating the normal OS is defined as a presence-requisite-for-OS-activation file;
   said failure forcing unit keeps said presence-requisite-for-OS-activation file absent from said predetermined location until the completion of the recovery, the completion of the last reactivation of the recovery OS in the recovery task, or the completion of the last replacement of the recovery recording medium in the recovery task.

3. The computer recovery apparatus according to claim 1, wherein:
   a file which is recorded on a predetermined location in—remove said external—storage device and to be read for activating;
   said failure forcing unit keeps the activation-failure-causing presence-requisite-for-OS-activation file present in said predetermined location instead of the regular presence-requisite-for OS-activation file until the completion of the recovery, the completion of the last reactivation of the recovery OS in the recovery task, or the completion of the last replacement of the recovery recording medium in the recovery task.

4. The computer recovery apparatus according to claim 1, wherein:
   a file which is recorded on a predetermined location in—remove said external—storage device and to be read for activating;
   said failure forcing unit keeps the modified presence-requisite-for-OS-activation file present in said predetermined location instead of the regular presence-requisite-for OS-activation file until the completion of the recovery, the completion of the last reactivation of the recovery OS in the recovery task, or the completion of the last replacement of the recovery recording medium in the recovery task.

5. The computer recovery apparatus according to claim 1, wherein:
   a file which does not need to be read for the activation of the normal OS but is read and executed during the activation of the normal OS if the file exists in a predetermined location in the—remove external—storage device;
   said failure forcing unit keeps the activation-failure-causing read-at-OS-activation file present in said predetermined location instead of the regular read-at-OS-activation file until the completion of the recovery, the completion of the last reactivation of the recovery OS in the recovery task, or the completion of the last replacement of the recovery recording medium in the recovery task.

6. The computer recovery apparatus according to claim 1, wherein:
   a file which does not need to be read for the activation of the normal OS but is read and executed during the activation of the normal OS if the file exists in a predetermined location in the—remove external—storage device;
   said failure forcing unit keeps the modified read-at-OS-activation file present in the predetermined location instead of the regular read-at-OS-activation file until the completion of the recovery, the completion of the last reactivation of the recovery OS in the recovery task, or the completion of the last replacement of the recovery recording medium in the recovery task.

7. The computer recovery apparatus according to claim 1, wherein:
   a file which does not need to be read for the activation of the normal OS but is read and executed during the activation of the normal OS if the file exists in a predetermined location in the—remove external—storage device;
   said failure forcing unit keeps the activation-failure-causing read-at-OS-activation file present in the predetermined location until the completion of the recovery, the completion of the last reactivation of the recovery OS in the recovery task, or the completion of the last replacement of the recovery recording medium in the recovery task, and removes all the read-at-OS-activation files including the activation-failure-causing read-at-OS-activation file from the predetermined location after the completion of the recovery, the completion of the last reactivation of the recovery OS in the recovery task, or the completion of the last replacement of the recovery recording medium in the recovery task.

8. The computer recovery apparatus according to claim 1, comprising:
   a notification unit for notifying a user of a mis-activation-operation, if the user mistakenly performs an operation for activating the normal OS before the completion of the recovery, the completion of the last reactivation of the recovery OS in the recovery task, or the completion of the last replacement of the recovery recording medium in the recovery task.

9. The computer recovery apparatus according to claim 8, wherein:
   said notification unit is an unit for displaying text on a display or unit for generating a sound to notify the user of the mis-activation-operation, or unit for ejecting a tray containing the recovery recording medium.

10. The computer recovery apparatus according to claims 1, further comprising:
    a notification unit for providing to the user an error code corresponding to a mis-activation-operation, if the user mistakenly performs the operation for activating the normal OS before the completion of the recovery, the completion of the last reactivation of the recovery OS in the recovery task, or the completion of the last replacement of the recording medium for recovery in the recovery task.

11. A computer recovery method for reading preload image data from a recovery recording medium to recover a preload image into an external storage device, wherein:
    an OS which is recorded on said external storage device and to be recovered is defined as a normal OS and an OS which is recorded on a recording medium other than said—remove external—storage device and used for a recovery task is defined as a recovery OS;
    said method comprises the step of causing the activation of the normal OS to fail if a user mistakenly performs an operation for activating the normal OS during the recovery.

12. The computer recovery method according to claim 11, wherein:
    a file which is recorded on a predetermined location in said external storage device and to be read for activating the normal OS is defined as a presence-requisite-for-OS-activation file; and
    said method comprises the step of keeping said presence-requisite-for-OS-activation file absent from said predetermined location until the completion of a recovery, the completion of the last reactivation of a recovery OS in a recovery task, or the completion of the last replacement of the recovery recording medium in the recovery task.

13. The computer recovery method according to claim 11, wherein:
    a file which is recorded on a predetermined location in said external storage device and to be read for activating the normal OS is defined as a presence-requisite-for-OS-activation file and an activation-failure-causing presence-requisite-for-OS-activation file which has the same name as that of the presence-requisite-for-OS-activation file and does not activate the normal OS even when being read is provided besides the regular presence-requisite-for-OS-activation file; and
    said method comprises the step of keeping the activation-failure-causing presence-requisite-for-OS-activation file present in said predetermined location instead of the regular presence-requisite-for-OS-activation file until the completion of a recovery, the completion of the last reactivation of the recovery OS in the recovery task, or the completion of the last replacement of the recovery recording medium in the recovery task.

14. The computer recovery method according to claim 11, wherein:
    a file which is recorded on a predetermined location in said external storage device and to be read for activating the normal OS is defined as a presence-requisite-for-OS-activation file, and a modified presence-requisite-for-OS-activation file modified from the regular presence-requisite-for-OS-activation file so as to cause the activation of the normal OS to fail even when being read by the computer is provided besides the regular presence-requisite-for-OS-activation file; and
    said method comprises the step of keeping the modified presence-requisite-for-OS-activation file present in said predetermined location instead of the regular presence-requisite-for-OS-activation file until the completion of the recovery, the completion of the last reactivation of the recovery OS in the recovery task, or the completion of the last replacement of the recovery recording medium in the recovery task.

15. The computer recovery method according to claim 11, wherein:
    a file which does not need to be read for the activation of the normal OS but is read and executed during the activation of the normal OS if the file exists in a predetermined location in the external storage device is defined as a read-at-OS-activation file and an activation-failure-causing read-at-OS-activation file which has the same name as that of the read-at-OS-activation file and does not activate the normal OS when it is read is provided besides the regular presence-requisite-for-OS-activation file; and
    said method comprises the step of keeping the activation-failure-causing read-at-OS-activation file present in said predetermined location instead of the regular read-at-OS-activation file until the completion of the recovery, the completion of the last reactivation of the recovery OS in the recovery task, or the completion of the last replacement of the recovery recording medium in the recovery task.

16. The computer recovery method according to claim 11, wherein:
    a file which does not need to be read for the activation of the normal OS but is read and executed during the activation of the normal OS if the file exists in a predetermined location in said external storage device is defined as a read-at-OS-activation file, and a modified read-at-OS-activation file which is modified so as to cause the activation of the normal OS to fail if read by the computer is provided besides the regular read-at-OS-activation file; and
    said method comprises the step of keeping the modified read-at-OS-activation file present in the predetermined location instead of the regular read-at-OS-activation file until the completion of the recovery, the completion of the last reactivation of the recovery OS in the recovery task, or the completion of the last replacement of the recovery recording medium in the recovery task.

17. The computer recovery method according to claim 11, wherein:

a file which does not need to be read for the activation of the normal OS but is read and executed during the activation of the normal OS if said file exists in a predetermined location in said external storage device is defined as a read-at-OS-activation file, and an activation-failure-causing read-at-OS-activation file which causes the activation of the normal OS to fail when read by the computer is provided; and said method comprises the steps of keeping the activation-failure-causing read-at-OS-activation file present in the predetermined location until the completion of the recovery, the completion of the last reactivation of the recovery OS in the recovery task, or the completion of the last replacement of the recovery recording medium in the recovery task, and removing all the read-at-OS-activation files including the activation-failure-causing read-at-OS-activation file from the predetermined location after the completion of the recovery, the completion of the last reactivation of the recovery OS in the recovery task, or the completion of the last replacement of the recovery recording medium in the recovery task.

18. The computer recovery method according to claim 11, comprising the step of:

notifying a user of a mis-activation-operation, if the user mistakenly performs an operation for activating the normal OS before the completion of the recovery, the completion of the last reactivation of the recovery OS in the recovery task, or the completion of the last replacement of the recovery recording medium in the recovery task.

19. The computer recovery method according to claim 18, wherein:

said notification step is made by displaying text on a display or generating a sound to notify the user of the mis-activation-operation, or ejecting a tray containing the recovery recording medium.

20. The computer recovery method according to claim 11, further comprising the steps of:

providing an error code corresponding to a mis-activation-operation to the user, if the user mistakenly performs the operation for activating a normal OS before the completion of the recovery, the completion of the last reactivation of the recovery OS in the recovery task, or the completion of the last replacement of the recording medium for recovery in the recovery task.

21. A computer readable recording medium on which a computer recovery program is recorded having computer executable instructions for reading preload image data from a recovery recording medium to recover a preload image into an external storage device, wherein: an OS which is recorded on said external storage device and to be recovered is defined as a normal OS and an OS which is recorded on a recording medium other than said—remove external—storage device and used for a recovery task is defined as a recovery OS;

an OS which is recorded on said external storage device and to be recovered is defined as a normal OS and an OS which is recorded on a recording medium other than said external storage device and used for the recovery task is defined as a recovery OS; and said computer recovery program comprises the step of causing the activation of the normal OS to fail if a user mistakenly performs an operation for activating the normal OS during the recovery.

22. The recording medium according to claim 21, wherein:

a file which is recorded on a predetermined location in said external storage device and to be read for activating the normal OS is defined as a presence-requisite-for-OS-activation file; and said computer recovery program comprises the step of keeping said presence-requisite-for-OS-activation file absent from said predetermined location until the completion of a recovery, the completion of the last reactivation of a recovery OS in a recovery task, or the completion of the last replacement of a recovery recording medium in the recovery task.

23. The recording medium, according to claim 21, wherein:

a file which is recorded on a predetermined location in said external storage device and to be read for activating the normal OS is defined as a presence-requisite-for-OS-activation file and an activation-failure-causing presence-requisite-for-OS-activation file which has the same name as that of the presence-requisite-for-OS-activation file and does not activate the normal OS even when being read is provided besides the regular presence-requisite-for-OS-activation file; and said computer recovery program comprises the step of keeping the activation-failure-causing presence-requisite-for-OS-activation file present in said predetermined location instead of the regular presence-requisite-for OS-activation file until the completion of a recovery, the completion of the last reactivation of the recovery OS in the recovery task, or the completion of the last replacement of the recovery recording medium in the recovery task.

24. The computer recording medium according to claim 21, wherein:

a file which is recorded on a predetermined location in said external storage device and to be read for activating the normal OS is defined as a presence-requisite-for-OS-activation file, and a modified presence-requisite-for-OS-activation file modified from the regular presence-requisite-for-OS-activation so as to cause the activation of the normal OS to fail is provided besides the regular presence-requisite-for-OS-activation file; and said computer recovery program comprises the step of keeping the modified presence-requisite-for-OS-activation file present in said predetermined location instead of the regular presence-requisite-for OS-activation file until the completion of the recovery, the completion of the last reactivation of the recovery OS in the recovery task, or the completion of the last replacement of the recovery recording medium in the recovery task.

25. The recording medium according to claim 21, wherein:

a file which does not need to be read for the activation of the normal OS but is read and executed during the activation of the normal OS if the file exists in a predetermined location in the external storage device is defined as a read-at-OS-activation file and an activation failure-causing read-at-OS-activation file which has the same name as that of the read-at-OS-activation file and does not activate the normal OS when it is read is provided besides the regular presence-requisite-for-OS-activation file; and said computer recovery program comprises the step of keeping the activation-failure-causing read-at-OS-activation file present in said predetermined location instead of the regular read-at-OS-activation file until the completion of the recovery, the completion of the last reactivation of the recovery OS in the recovery task, or the completion of the last replacement of the recovery recording medium in the recovery task.

26. The recording medium according to claim 21, wherein:

a file which does not need to be read for the activation of the normal OS but is read and executed during the activation of the normal OS if the file exists in a predetermined location in said external storage device is defined as a read-at-OS-activation file, and a modified read-at-OS-activation file which is modified so as to cause the activation of the normal OS to fail if read by the computer is provided besides the regular read-at-OS-activation file; and said computer recovery program comprises the step of keeping the modified read-at-OS-activation file present in the predetermined location instead of the regular read-at-OS-activation file until the completion of the recovery, the completion of the last reactivation of the recovery OS in the recovery task, or the completion of the last replacement of the recovery recording medium in the recovery task.

27. The recording medium according to claim 21, wherein:

a file which does not need to be read for the activation of the normal OS but is read and executed during the activation of the normal OS if said file exists in a predetermined location in said external storage device is defined as a read-at-OS-activation file, and an activation-failure-causing read-at-OS-activation file which causes the activation of the normal OS to fail when read by the computer is provided; and said computer recovery program comprises the steps of keeping the activation-failure-causing read-at-OS-activation file present in the predetermined location until the completion of the recovery, the completion of the last reactivation of the recovery OS in the recovery task, or the completion of the last replacement of the recovery recording medium in the recovery task, and removing all the read-at-OS-activation files including the activation-failure-causing read-at-OS-activation file from the predetermined location after the completion of the recovery, the completion of the last reactivation of the recovery OS in the recovery task, or the completion of the last replacement of the recovery recording medium in the recovery task.

28. A computer readable delivery apparatus for delivering a computer recovery program having computer executable instructions for reading preload image data from a recovery recording medium to recover a preload image into an external storage device, wherein: an OS which is recorded on said external storage device and to be recovered is defined as a normal OS and an OS which is recorded on a recording medium other than said—remove external—storage device and used for a recovery task is defined as a recovery OS;

an OS which is recorded on said external storage device and to be recovered is defined as a normal OS and an OS which is recorded on a recording medium other than said external storage device and used for the recovery task is defined as a recovery OS; and said computer recovery program comprises the step of causing the activation of the normal OS to fail if a user mistakenly performs an operation for activating the normal OS during the recovery.

* * * * *